United States Patent
Ryu et al.

(10) Patent No.: US 7,822,063 B2
(45) Date of Patent: Oct. 26, 2010

(54) BANDWIDTH ALLOCATION METHOD AND SYSTEM FOR DATA TRANSMISSION IN EPON

(75) Inventors: Hyun-surk Ryu, Suwon-si (KR); Myung-sik Yoo, Seoul (KR); Min-ho Kang, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1502 days.

(21) Appl. No.: 11/181,851

(22) Filed: Jul. 15, 2005

(65) Prior Publication Data
US 2006/0153564 A1    Jul. 13, 2006

(30) Foreign Application Priority Data
Jan. 12, 2005    (KR) ...................... 10-2005-0002895

(51) Int. Cl.
*H04L 12/28* (2006.01)
*H04J 3/16* (2006.01)

(52) U.S. Cl. .................................. 370/468; 370/395.43

(58) Field of Classification Search ............ 370/395.21, 370/468, 395.64, 395.65, 395.61, 395.4, 370/400, 235, 236, 231, 232, 412, 413
See application file for complete search history.

(56) References Cited

U.S. PATENT DOCUMENTS

| | | | |
|---|---|---|---|
| 6,219,728 B1 * | 4/2001 | Yin | 710/52 |
| 6,370,117 B1 * | 4/2002 | Koraitim et al. | 370/232 |
| 6,813,277 B2 * | 11/2004 | Edmon et al. | 370/442 |
| 6,859,458 B2 * | 2/2005 | Yuang et al. | 370/395.43 |
| 7,180,910 B2 * | 2/2007 | Kim et al. | 370/468 |
| 7,209,443 B2 * | 4/2007 | Mukai et al. | 370/235 |
| 7,257,326 B2 * | 8/2007 | Song et al. | 398/99 |
| 7,362,975 B2 * | 4/2008 | Choi et al. | 398/58 |

* cited by examiner

*Primary Examiner*—Hanh Nguyen
(74) *Attorney, Agent, or Firm*—Sughrue Mion, PLLC

(57) ABSTRACT

A method for efficiently allocating a bandwidth at an optical line terminal (OLT) for upstream transmission in an Ethernet passive optical network (EPON) system. An optical network unit (ONU) divides data to be transmitted into at least two groups that include a group with a constant bit rate (CBR) and a group with a variable bit rate (VBR), and requests a required bandwidth for each of the divided groups. The OLT allocates the requested bandwidth to the group with the CBR within a first bandwidth among an allocated bandwidth including the first bandwidth and a second bandwidth. The ONU transmits data using bandwidth allocated to the divided groups by the OLT.

8 Claims, 5 Drawing Sheets

BANDWIDTH ALLOCATION METHOD AND SYSTEM FOR DATA TRANSMISSION IN EPON

CROSS-REFERENCE TO RELATED APPLICATIONS

This application claims priority from Korean Patent Application No. 2005-2895 filed on Jan. 12, 2005 in the Korean Intellectual Property Office, the entire disclosure of which is incorporated herein by reference.

BACKGROUND OF THE INVENTION

1. Field of the Invention

Methods and systems consistent with the present invention relate generally to an Ethernet passive optical network (EPON), and more particularly, to efficiently distributing an upstream transmission bandwidth in an EPON architecture.

2. Description of the Related Art

To establish subscriber networks from a central office (CO) to buildings or home, various network architectures have been suggested such as x-Digital Subscriber Line (xDSL), Hybrid Fiber Coax (HFC), fiber-to-the-building (FTTB), fiber-to-the-curb (FTTC), fiber-to-the-home (FTTH), and the like. Among these architectures, the deployment of the FTTx (x=B, C, H) can be divided into an active FTTx with an active optical network (AON) architecture and a passive FTTx with a passive optical network (PON) architecture. The PON offers lower costs using a point-to-multipoint topology with passive elements. It is expected that the PON, which is advantageous over broadband services converging audio, data, and broadcasting in the subscriber networks designated as a bottleneck, can aid the implementation and the activation of digital home networks.

The PON connects one optical line terminal (OLT) with a plurality of optical network units (ONUs) using a 1×N passive optical splitter, and constructs a distribution topology of a tree structure.

FIG. 1 shows a construction of a conventional EPON system. The following is an explanation of operations at components of the conventional EPON system in reference to FIG. 1.

The EPON system is configured with one OLT 100 and a plurality of ONUs 120 through 126 connected through a single mode fiber (SMF) in the form of the tree structure. The OLT 100 at a communication company's central office functions like a digital subscriber line access multiplex (DSLAM) that controls a digital subscriber line (DSL) or cable modem services. The OLT 100 broadcasts downstream traffic signals to service subscribers. The ONUs 120 through 126 control and collect upstream traffic signals based their priority, and forward the signals to a transport network such as the Internet and/or a public switched telephone network (PSTN). A passive optical splitter (POS) 110 splits the power of the received optical signal according to the number of the ONUs, and supplies the optical signal with the split power to the first ONU 120 and a passive optical splitter 112. The passive optical splitter 112 operates the same as the passive optical splitter 110.

The first ONU 120 converts the received optical signal to an Ethernet frame which is an electric signal and provides the Ethernet frame to a first end user 130. Also, the first ONU 120 converts data received from the first end user 130 to an optical signal and forwards the optical signal to the OLT 100. The second ONU 122 through the fourth ONU 126 operate the same as the first ONU 120.

As explained above, the data transmission in the EPON system is carried out downstream from the OLT to the ONU and upstream from the ONU to the OLT. The downstream transmission broadcasts data to all ONUs connected to the OLT, and the upstream transmission unicasts data from the plurality of ONUs using a common bandwidth allocated according to the time division multiple access (TDMA) mechanism. To do this, the OLT allocates the common bandwidth to each ONU for the upstream transmission, which is called dynamic bandwidth allocation (DBA). The DBA performed by the OLT for the upstream transmission is a crucial factor to determine efficiency of the EPON system.

As the conventional subscriber network evolves into the optical subscriber network employing optical elements, such as EPON, increased quality of service (QoS) is demanded for various services. Diverse DBA mechanisms for the EPON system have been proposed in response to the QoS support, but they are incapable of providing sufficient support to satisfy the QoS requirement with respect to the diverse services. In the following, conventional DBA algorithms are described.

The conventional DBA algorithms include: 1) a fixed window algorithm that allocates a fixed transmission window (bandwidth) regardless of a user traffic condition, similar to TDMA; 2) a gated window algorithm in which the OLT allocates a requested bandwidth if the ONU calculates the amount of the traffic of the end users queuing at the ONU and requests the corresponding bandwidth allocation; 3) a limited window algorithm in which the OLT allocates the bandwidth not to exceed the maximum allocation bandwidth available to the ONUs if the ONU calculates the amount of the traffic of the end users and requests the corresponding bandwidth allocation; and 4) a credit window algorithm in which the OLT allocates the bandwidth by adding up the requested bandwidth from the ONU and an extra bandwidth. The credit window algorithm can be divided into a constant credit window algorithm and a linear credit window algorithm. The constant window credit algorithm allocates the bandwidth by adding up the bandwidth requested from the ONU and a preset bandwidth. The linear credit window algorithm allocates the bandwidth by adding up the requested bandwidth of the ONU and a bandwidth that is proportional to the requested bandwidth.

However, the above conventional DBA algorithms cannot provide sufficient support for the QoS. For example, the fixed window algorithm may limit the number of subscribers intending to use the services, and is incapable of actively dealing with the rapidly changing traffic due to the absence of the DBA capability. The gated window algorithm is subject to the unfair bandwidth allocation to the plurality of the ONUs because the ONU allocates the bandwidth as requested. In addition, the gated window algorithm lacks the ability to deal with the real-time services in an active manner. In other words, while the gated window algorithm can maximize the efficiency in view of the network operator, the QoS is not provided to some satisfactory degree in view of the end user. The limited window algorithm cannot actively handle the real-time traffic variation due to the limited bandwidth since the maximum bandwidth available to the ONUs is restricted. The credit window algorithm allocates the extra bandwidth to the ONU in order to actively cope with the real-time traffic variation, but may allocate unnecessary bandwidth amount even if the amount of the requested bandwidth is less.

SUMMARY OF THE INVENTION

An aspect of the present invention provides a method for efficiently allocating a bandwidth for upstream transmission by OLT in an EPON system.

Another aspect of the present invention provides a method for allocating a bandwidth by an OLT so as to support QoS required for an upstream transmission traffic.

Still another aspect of the present invention provides an EPON system for actively dealing with a traffic amount which varies in real-time.

In accordance with an aspect of the present invention, there is provided a bandwidth allocation method for transmitting requested data from an OLT to an ONU in an EPON that includes an OLT and at least one ONU connected to the OLT, includes dividing the data to be transmitted into at least two groups that include a group with a constant bit rate (CBR) and a group with a variable bit rate (VBR) and receiving a request for a required bandwidth for the divided groups; and allocating the requested bandwidth to the group with the CBR within a first bandwidth among an allocated bandwidth including the first bandwidth and a second bandwidth.

In accordance with another aspect of the present invention, there is provided a bandwidth allocation method for transmitting requested data from an OLT to an ONU in an EPON that includes an OLT and at least one ONU connected to the OLT, includes dividing the data to be transmitted into at least two groups that include a group with a CBR and a group with a VBR and requesting a required bandwidth for the divided groups; and transmitting data using the bandwidth allocated to the divided groups, respectively.

In accordance with yet another aspect of the present invention, an EPON system includes an ONU for dividing the data to be transmitted into at least two groups that include a group with a CBR and a group with a VBR and requesting a required bandwidth for the divided groups; and an OLT for allocating the requested bandwidth to the group with the CBR within a first bandwidth among an allocated bandwidth that includes the first bandwidth and a second bandwidth.

BRIEF DESCRIPTION OF THE DRAWING FIGURES

The above and/or other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS

Figure 1:
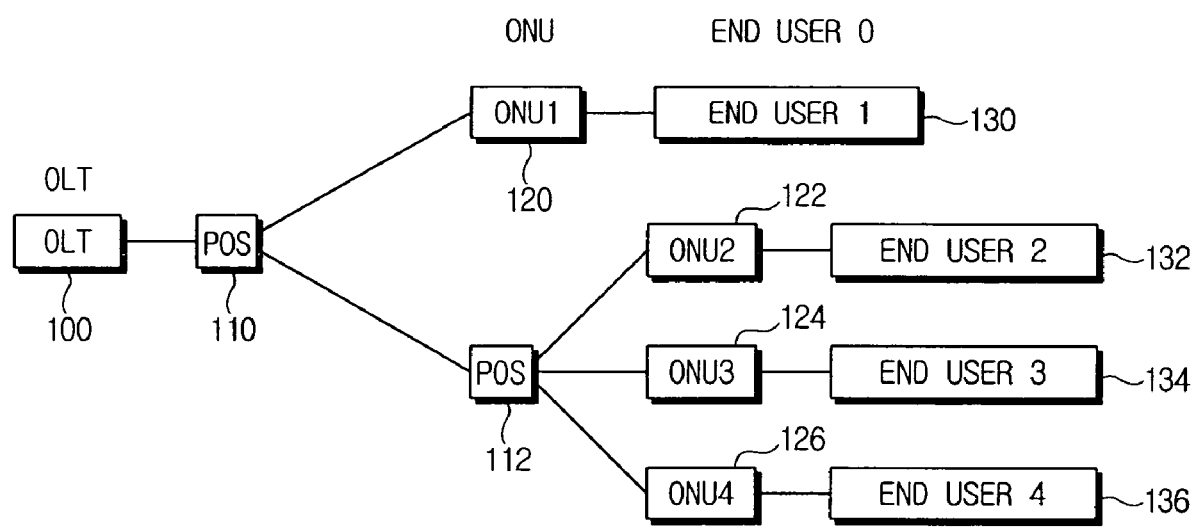
FIG. 1 illustrates a construction of an Ethernet passive optical network (EPON)

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

A variable transmission window algorithm according to an exemplary embodiment of the present invention can provide diverse service quality, as compared with the conventional algorithms, and actively cope with rapid changes of the traffic. The variable transmission window algorithm divides the traffic to be transmitted into at least two groups according to the characteristics of the traffic. Hereinafter, descriptions focuses on the three groups which are divided based on the characteristics of the traffic to be transmitted.

A first group traffic belonging to the first group is an audio data traffic with a CBR, a second group traffic belonging to the second group is a real-time video streaming traffic with a VBR, and a third group traffic belonging to the third group is a general traffic such as electronic-mail.

A constant bandwidth is allocated to the first group traffic according to its CBR characteristic, a variable bandwidth is allocated to the second group traffic according to its VBR characteristic, and a remaining bandwidth is allocated to the third group traffic. Thus, a QoS suitable for the characteristic of each group traffic can be attained. Especially, an extra transmission window Window_Extra is reserved for the second group traffic and the third group traffic that have the rapid changeability of the required bandwidth, to thus improve the QoS of the second and third group traffics. Unlike the conventional limited transmission window algorithm, the variable transmission window algorithm proposes a transmission window that can be allocated to the second group traffic and the third group traffic that experience a significant change of the required bandwidth due to the VBR characteristic.

A maximum transmission window of the variable transmission window algorithm is the summation of a maximum transmission window Window_Limited of the limited transmission window algorithm and an extra transmission window available only to the second and the third group traffics. Accordingly, the variable transmission window algorithm allocates the extra transmission window with respect to the rapidly changing traffic of the second and third group traffics, to thus obtain more active bandwidth allocation than the conventional limited transmission window algorithm. The following is an explanation as for the variable transmission window algorithm according to an exemplary embodiment of the present invention in reference to the attached drawings.

Figure 2:
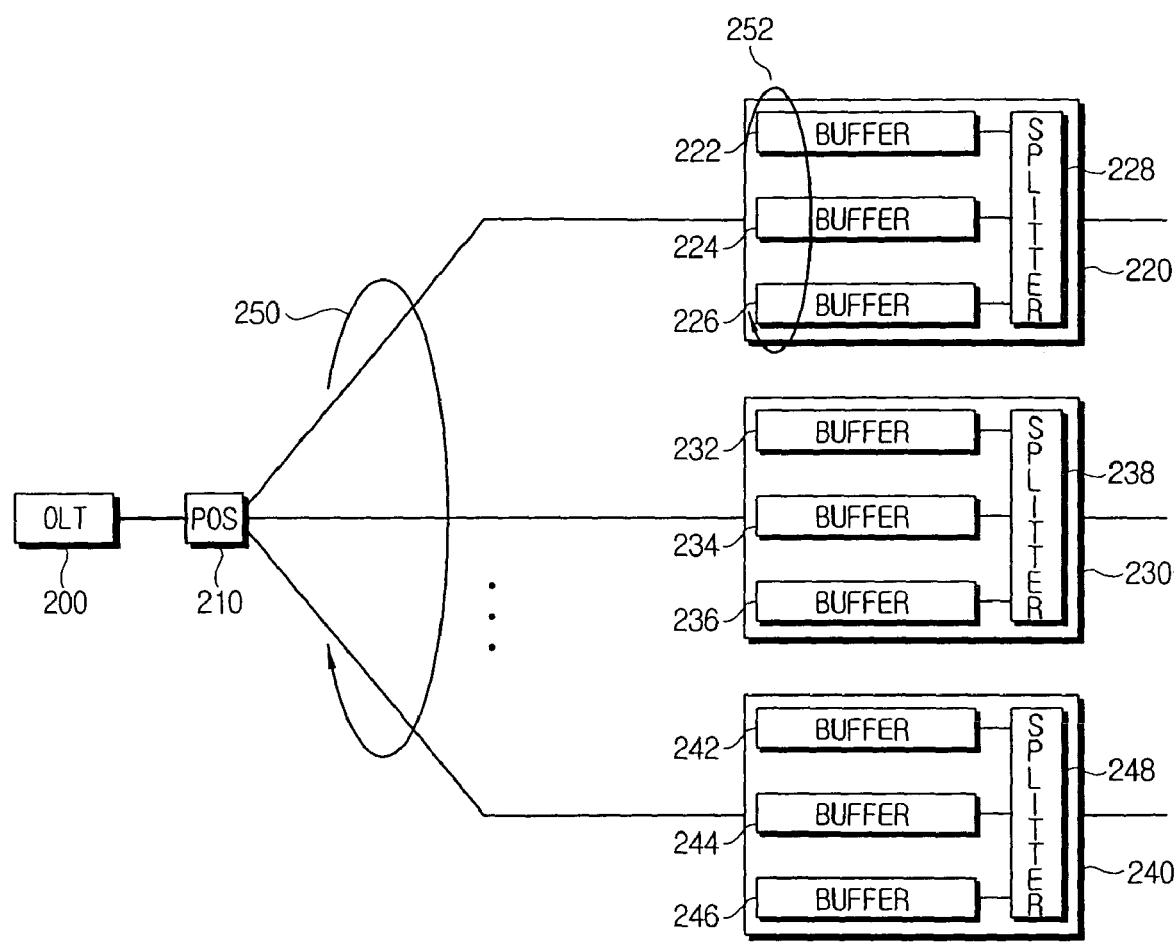
FIG. 2 illustrates bandwidth scheduling at an optical line terminal (OLT) for an upstream transmission.

FIG. 2 illustrates the scheduling of the bandwidth at an OLT for upstream transmission. A first ONU 220 includes three buffers 222 through 226 and a traffic splitter 228. The traffic splitter 228 determines which one of the first through third groups that a traffic received from an end user belongs to. If the received traffic belongs to the first group (i.e., is the first group traffic), the traffic splitter 228 provides the received traffic to the buffer 222. If the received traffic belongs to the second group (i.e., is the second group traffic), the received traffic is provided to the buffer 224. If the received traffic belongs to the third group (i.e., is the third group traffic), the traffic splitter 228 provides the received traffic to the buffer 226.

When the buffers 222 through 226 buffer the traffics, the first ONU 220 requests a bandwidth for the traffic transmission to the OLT 200. Likewise, a second ONU 230 through an n-th ONU 240 operate the same as the first ONU 220. Upon receiving the request for the bandwidth, the OLT 200 schedules the bandwidth to be allocated to the ONUs 220, 230, and 240. The OLT 200 schedules the bandwidth in consideration of the first ONU 220 through the n-th ONU 240, which is referred to as an inter-ONU scheduling 250. The OLT 200 schedules the bandwidth to be allocated to group traffics within the bandwidth allocated to the ONUs, which is referred to as an intra-ONU scheduling 252.

Figure 3:
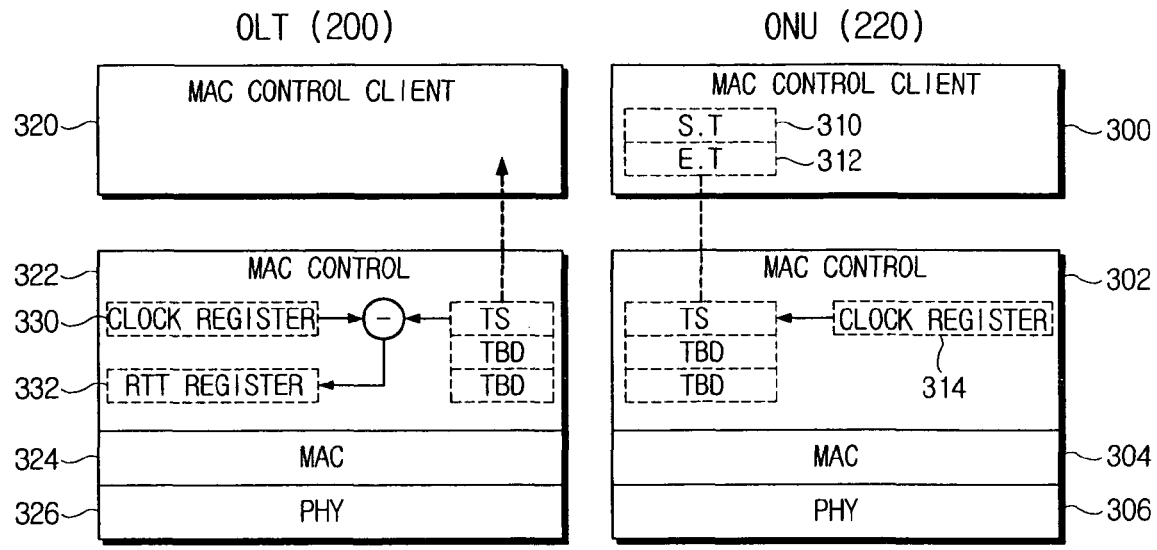
FIG. 3 illustrates a REPORT message for requesting the bandwidth allocation.

FIG. 3 illustrates a REPORT message that requests the bandwidth allocation from the ONU 220 to the OLT 200 according to an exemplary embodiment of the present invention. The REPORT message may be transmitted with or without the request of the OLT 200.

A media access control (MAC) control client layer 300 of the ONU 220 creates a REPORT message which contains information relating to a transmission start time S.T 310 and a transmission end time E.T 312.

The REPORT message is sent to the following lower layer, an MAC control layer 302, and is synchronized with the OLT 200 using synchronization information provided from a clock register 314. The REPORT message further contains information TBD relating to the amount of a timeslot (bandwidth) to be allocated next time. The amount of the timeslot depends on an amount of packets buffered at the buffers of the ONU 220.

The REPORT message is provided to the OLT 200 via an MAC layer 304 and a physical (PHY) layer 306 of the ONU 220. Hereinafter, an operation at the OLT 200 is set forth. The REPORT message is delivered to an MAC control layer 322 of the OLT 200 via a PHY layer 326 and an MAC layer 324 of the OLT 200.

The MAC control layer 322 synchronizes the ONU 220 with the OLT 200 based on of the synchronization information provided from the clock register 314 of the ONU 220 and synchronization information provided from its clock register 330. The MAC control layer 322 calculates a round trip time RTT between the ONU 220 and the OLT 200 based on the synchronization. The calculated RTT is supplied to a RTT register 332. The REPORT message synchronized with the RTT is forwarded to an upper layer, an MAC control client layer 320.

Figure 4:
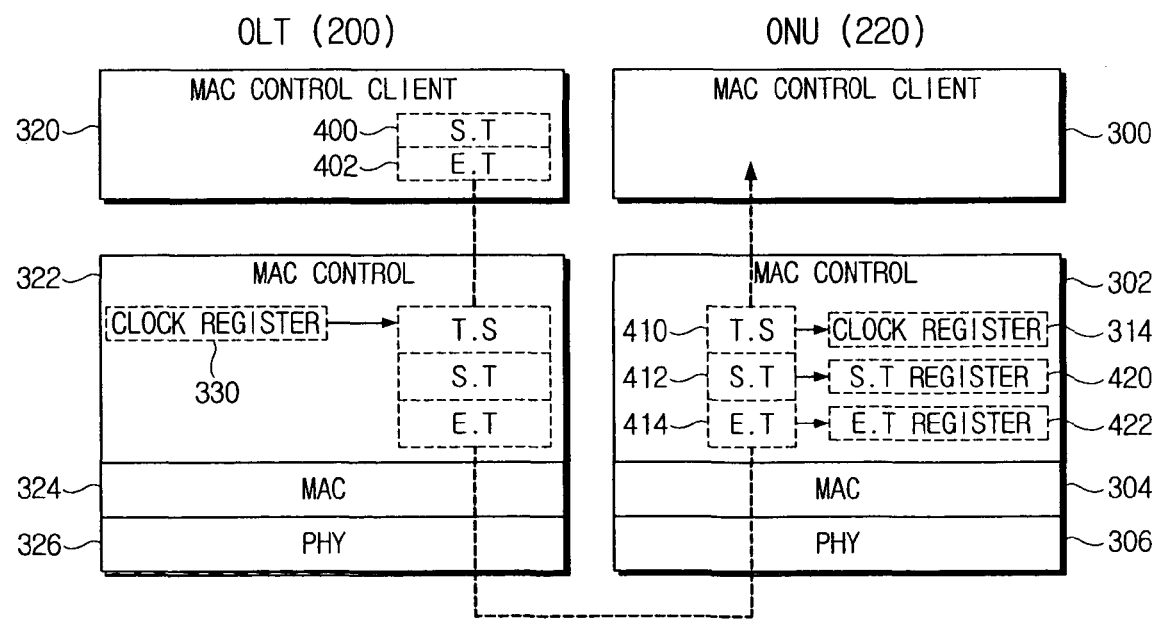
FIG. 4 illustrates an ALLOCATE message for allocating the requested bandwidth.

FIG. 4 illustrates a BANDWIDTH ALLOCATE message in response to the REPORT message according to an exemplary embodiment of the present invention. The MAC control client layer 320 creates an ALLOCATE message destined for the ONU 220. The ALLOCATE message contains a transmission start time S.T 400 and a transmission end time E.T 402.

The OLT 200 and the ONU 220 need to be synchronized to avoid collisions since data is transmitted therebetween according to TDMA. To this end, the ALLOCATE message contains the synchronization information provided from the clock register 330 in the MAC control layer 322. The ALLOCATE message is delivered to the MAC control layer 302 of the ONU 220 via the MAC layer 324 and the PHY layer 324 of the OLT 200, and then via the PHY layer 306 and the MAC layer 304 of the ONU 220.

Upon receiving the REPORT message, the MAC control layer 302 acquires the transmission start time S.T 412, the transmission end time E.T 414, and the synchronization information T.S 410. The acquired synchronization information 410 is transferred to the clock register 314, the transmission start time 412 is transferred to an S.T register 420, and the transmission end time 414 is transferred to an E.T register 422. The clock register 314 synchronizes with the OLT 200 using the received synchronization information 410. The processed ALLOCATE message is forwarded to the MAC control client layer 300. The ONU 220 receiving the ALLOCATE message transmits a packet along an upstream data transmission path using the received information.

Figure 5:
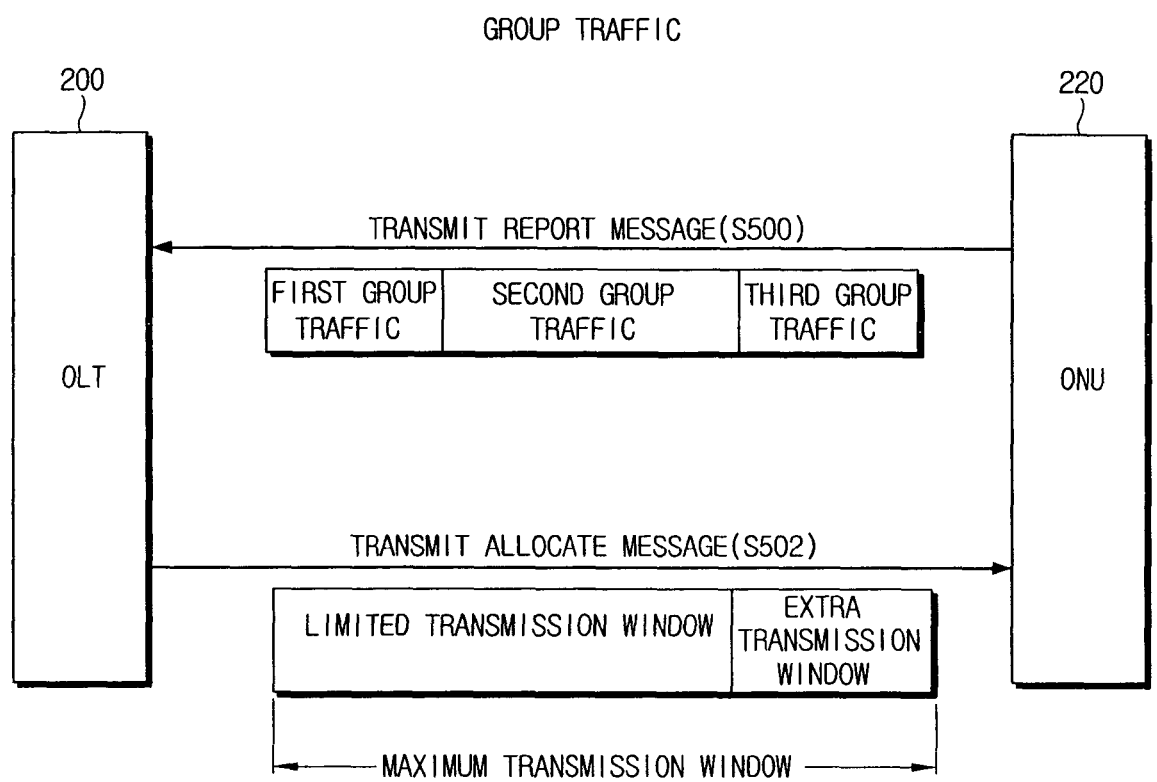
FIG. 5 illustrates a REPORT message and an ALLOCATE message transmitted and received between the OLT and the ONU.

FIG. 5 illustrates a REPORT message and an ALLOCATE message transmitted between the OLT 200 and the ONU 220 according to an exemplary embodiment of the present invention. The ONU 220 creates a REPORT message when the traffics are buffered at the buffers. The created REPORT message is transmitted to the OLT 200 (S500). As shown in FIG. 5, the REPORT message requests the bandwidth allocation depending on the amount of the group traffics buffered at the buffers. In particular, a wide bandwidth is requested for a large amount of buffered group traffics and a narrow bandwidth is requested for a small amount of buffered group traffics. FIG. 5 depicts that the second group traffic is larger than the first group traffic or the third group traffic in the relative traffic amount. Therefore, the ONU 220 requests more bandwidth for the second group traffic than the first group traffic or the third group traffic.

The OLT 200 determines the bandwidth to be allocated to each group traffic based on the information relating to the requested bandwidth contained in the received REPORT message. The OLT 200 creates an ALLOCATE message containing information relating to the determined bandwidth and transmits the ALLOCATE message to the ONU 220 (S502). The bandwidth available to the ONU 220 cannot exceed a maximum transmission window. The maximum transmission window is the summation of the limited transmission window and the extra transmission window. The bandwidth allocated to the first group traffic cannot exceed the limited transmission window. In other words, the extra transmission window delivers only the second and third group traffics. The size of the extra transmission window may vary according to a user's setting. The ONU 220 transmits the group traffics to the OLT 200 using the information on the bandwidth contained in the received ALLOCATE message.

Figure 6:
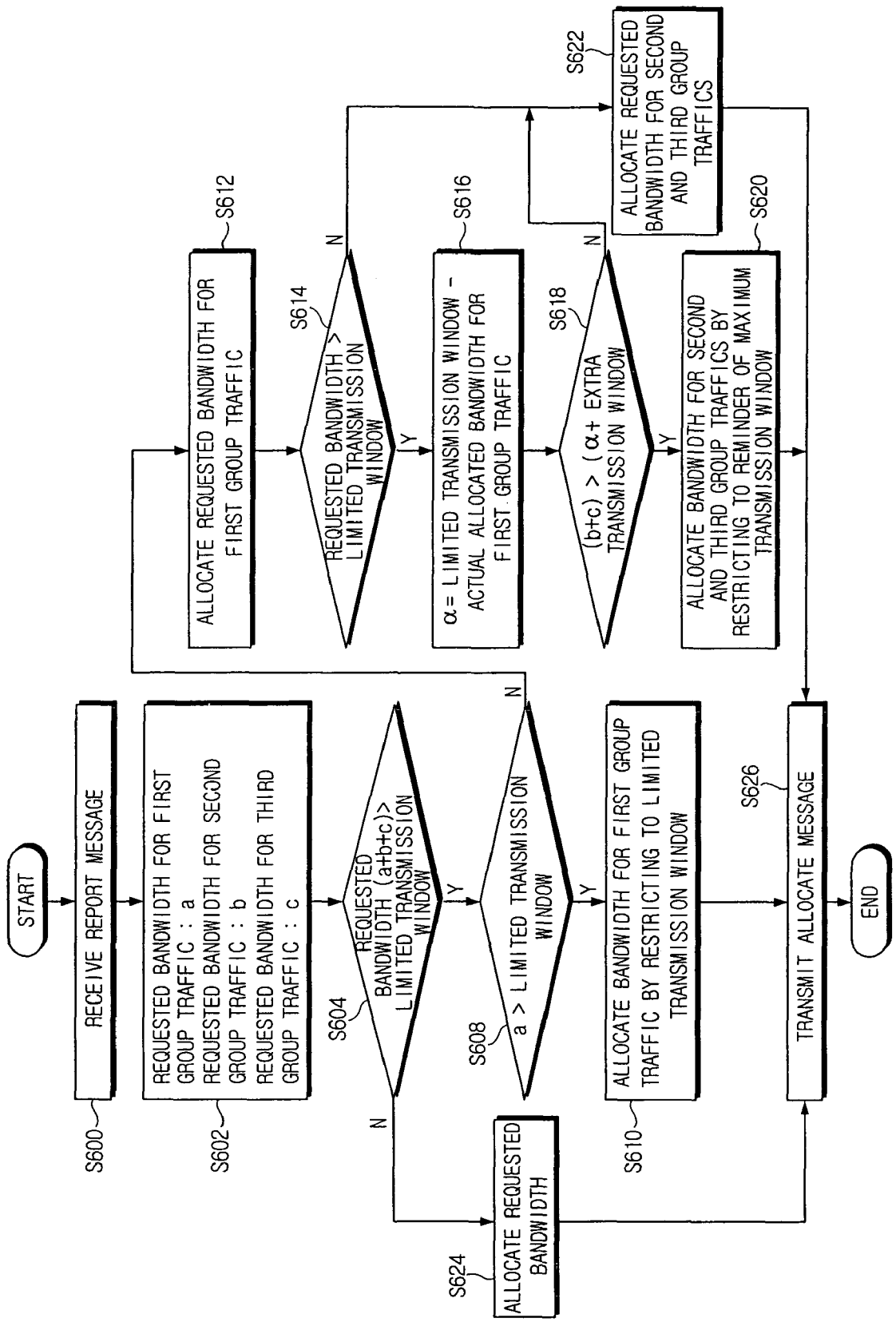
FIG. 6 is a flowchart explaining an operation of the OLT according to an exemplary embodiment of the present invention.

FIG. 6 illustrates an operation at the OLT 200 according to an exemplary embodiment of the present invention, which is explained in detail.

The OLT 200 receives the REPORT message (S600). The OLT 200 extracts the information relating to the requested bandwidth from the REPORT message (S602). For example, let the bandwidth requested by the ONU 220 for the first group traffic be "a", the requested bandwidth for the second group traffic be "b", and the requested bandwidth for the third group traffic be "c".

The OLT 200 compares the requested bandwidth (a+b+c) with the size of the limited transmission window (S604). If the requested bandwidth is larger than the limited transmission window, the OLT 200 proceeds to operation S608. If the requested bandwidth does not exceed the limited transmission window, the OLT 200 proceeds to operation S624 in which OLT 200 allocates the requested bandwidth for the first, second and third group traffics and then proceeds to operation S626.

The OLT 200 compares the requested bandwidth a for the first group traffic with the limited transmission window in size (S608). If the requested bandwidth a for the first group traffic is larger than the limited transmission window, the OLT 200 proceeds to operation S610 in which the OLT 200 allocates the bandwidth for the first group traffic by restricting/limiting the bandwidth allocated for the first group traffic to the limited transmission window. If the requested bandwidth a for the first group traffic is not larger than the limited transmission window, the OLT 200 proceeds to operation S612 in which allocates the requested bandwidth for the first group traffic.

The OLT 200 compares the requested bandwidth with the size of the maximum transmission window (S614). If the requested bandwidth is larger than the maximum transmission window, the OLT 200 proceeds to operation S616 in which OLT 200 calculates the difference between the limited transmission window and the actual allocated bandwidth for the first group traffic in operation S612. Hereinafter, let the calculated difference be "α". The OLT 200 compares (b+c) with (α+extra transmission window) (S618). If (b+c) is larger than (α+extra transmission window), the OLT 200 proceeds to operation S620 in which the OLT 200 allocates the bandwidth for the second and third group traffics by restricting/limiting the bandwidth allocated for the second and third group traffics to the remaining bandwidth of the maximum transmission window excluding the bandwidth allocated for the first group traffic. If (b+c) is not larger than (α+extra transmission window), the OLT 200 proceeds to operation S622 in which the OLT 200 allocates the requested bandwidth for the second and third group traffics.

Lastly, the OLT 200 creates an ALLOCATE message containing information relating to the allocated bandwidth and transmits the created ALLOCATE message to the ONU 220 (S626).

If the first group traffic exceeds the limited transmission window at the ONU 220, the QoS of the first group traffic may decrease considerably. To avoid the decrease in the QoS, the ONU 220 monitors the buffer corresponding to the first group traffic. If the decrease in the QoS is estimated during the monitoring, the ONU 220 does not further buffer the first group traffic at the buffer. The size of the limited transmission window is defined on the basis of the amount of the first group traffic that is expected at the EPON system design phase, for the sake of the performance enhancement of the first group traffic. Alternatively, the EPON system may be designed to vary the size of the limited transmission window depending on the amount of the first group traffic.

The present invention pertains to the dynamic bandwidth allocation (DBA) algorithm for efficiently distributing the bandwidth to users in the EPON, which is one of the optical subscriber network technology. To this end, the present invention adopts the conventional DBA algorithms and thus contributes to improving the overall performance of the EPON. Furthermore, the users can experience the desired QoS for the various traffics.

Although a few exemplary embodiments of the present invention have been shown and described, it will be appreciated by those skilled in the art that changes may be made in these exemplary embodiments without departing from the principles and spirit of the invention, the scope of which is defined in the claims and their equivalents.

What is claimed is:

1. A bandwidth allocation method for transmitting data from an optical line terminal to an optical network unit in an Ethernet passive optical network, the bandwidth allocation method comprising:

dividing, by the optical network unit, the data to be transmitted into at least a first group with a constant bit rate and a second group with a variable bit rate;

receiving, at the optical line terminal, a request for a first requested bandwidth for the first group and a second requested bandwidth for the second group from the optical network unit;

allocating, by the optical line terminal, the first requested bandwidth within a first bandwidth of an allocated bandwidth, the allocated bandwidth including the first bandwidth and a second bandwidth; and allocating the second requested bandwidth within a remaining bandwidth of the allocated bandwidth after allocating the first requested bandwidth, wherein the allocating the first requested bandwidth comprises allocating the first requested bandwidth and the second requested bandwidth is greater than the first bandwidth and the first requested bandwidth is not greater than the first bandwidth, and the allocating the second requested bandwidth within the remaining bandwidth of the first bandwidth and the second bandwidth if a sum of the remaining bandwidth of the first bandwidth and the second bandwidth is less than or equal to the second requested bandwidth.

2. The bandwidth allocation method of claim 1, wherein the second bandwidth varies within the allocated bandwidth.

3. The bandwidth allocation method of claim 1, wherein the second requested bandwidth is allocated within a remaining bandwidth of the first bandwidth and at least a portion of the second bandwidth.

4. The bandwidth allocation method of claim 1, wherein a remaining portion of the first bandwidth is utilized for the allocation of the second requested bandwidth prior to any of the second bandwidth being utilized.

5. An Ethernet passive optical network system comprising:

an optical network unit which divides the data to be transmitted into at least a first group with a constant bit rate and a second group with a variable bit rate, and requests a first requested bandwidth for the first group and a second requested bandwidth for the second group; and an optical line terminal which allocates the first requested bandwidth within a first bandwidth of an allocated bandwidth, the allocated bandwidth including the first bandwidth and a second bandwidth, wherein the optical line terminal allocates the second requested bandwidth within a remaining bandwidth of the allocated bandwidth after allocating the first requested bandwidth, wherein the optical line terminal allocates the first requested bandwidth within the first bandwidth if a sum of the first requested bandwidth and the second requested bandwidth is greater than the first bandwidth and the first requested bandwidth is not greater than the first bandwidth, and the optical line terminal allocates the second requested bandwidth within the remaining bandwidth of the first bandwidth and the second bandwidth if a sum of the remaining bandwidth of the first bandwidth and the second bandwidth is less than or equal to the second requested bandwidth.

6. The Ethernet passive optical network system of claim 5, wherein the optical network unit comprises a buffer which buffers the data to be transmitted for each of the first and second groups.

7. The Ethernet passive optical network system of claim 5, wherein the second requested bandwidth is allocated within a remaining bandwidth of the first bandwidth and at least a portion of the second bandwidth.

8. The Ethernet passive optical network system of claim 5, wherein a remaining portion of the first bandwidth is utilized for the allocation of the second requested bandwidth prior to any of the second bandwidth being utilized.

* * * * *